United States Patent [19]

Alford et al.

[11] 4,329,236

[45] May 11, 1982

[54] TECHNIQUE FOR TERTIARY OIL RECOVERY

[75] Inventors: Harvey E. Alford, Amherst; Keng S. Chan, South Euclid, both of Ohio

[73] Assignee: The Standard Oil Company, Cleveland, Ohio

[21] Appl. No.: 136,641

[22] Filed: Apr. 2, 1980

[51] Int. Cl.$^3$ ............................................. E21B 43/22
[52] U.S. Cl. .............................. 252/8.55 D; 166/275
[58] Field of Search .................. 252/8.55 D; 166/252, 166/275

[56] References Cited

U.S. PATENT DOCUMENTS

| | | | |
|---|---|---|---|
| 2,653,909 | 9/1953 | Frazier | 252/42 X |
| 3,477,511 | 11/1969 | Jones et al. | 252/8.55 X |
| 3,506,071 | 4/1970 | Jones | 166/273 |
| 4,008,769 | 2/1977 | Chang | 252/8.55 X |
| 4,079,785 | 3/1978 | Hessert et al. | 166/252 X |
| 4,122,895 | 10/1978 | Sitton et al. | 166/273 X |
| 4,125,156 | 11/1978 | Glinsmann | 252/8.55 X |

*Primary Examiner*—Herbert B. Guynn
*Attorney, Agent, or Firm*—William A. Heidrich; Herbert D. Knudsen; Larry W. Evans

[57] ABSTRACT

The optimal salinity of an emulsifier system comprising an alcohol and a neutralized oxidized solvent extracted oil can be controlled to match the salinity of the brine used in the tertiary oil recovery process by controlling the acid number of the solvent extracted oil during the oxidation procedure, controlling the extent of the neutralization during neutralization of the oxidized solvent extracted oil, or both.

5 Claims, No Drawings

TECHNIQUE FOR TERTIARY OIL RECOVERY

BACKGROUND OF THE INVENTION

The present invention relates to an improvement over commonly assigned application Ser. No. 97,029, filed Nov. 21, 1979, the disclosure of which is incorporated herein by reference.

For a micellar fluid to be effective in enhanced oil recovery, the salt tolerance of the fluid should closely match the salt concentration of the water used in the process, which is usually constituted by the brine found in the oil reservoir. That is, the optimal salt concentration for the micellar fluid (i.e. the salt concentration of the brine at which the micellar fluid generates the largest amount of microemulsion phase between the displaced oil and brine) should closely match the brine concentration in the reservoir.

The optimal salt concentration for micellar fluids compounded with the current surfactants of choice, i.e. petroleum sulfonates, can be altered to closely match the brine concentrations in various oil reservoirs. However, this involves considerable work to pick an alcohol (cosurfactant) that will with the surfactant produce a fluid of proper optimal salinity. Considerable work may also be involved to pick the appropriate surfactant to alcohol ratio to produce a fluid of proper optimal salinity. All of this adds to the complication of enhanced oil recovery. Equally important, it is often necessary to use expensive alcohols, such as ethoxylated alcohols, hexanol and the like, to achieve the proper optimal salinity. These add greatly to the chemical cost of using such fluids for enhanced oil recovery.

In commonly assigned application Ser. No. 97,029, a new emulsifier system for use in enhanced oil recovery is disclosed. This system comprises a mixture of an alcohol having no more than 12 carbon atoms and a neutralized oxidized solvent extracted oil. No indication is given, however, of how to match the optimal salinity characteristics of these emulsifier systems to the brine encountered in particular oil reservoirs.

Accordingly, it is an object of the present invention to provide a means for adjusting the optimal salinity of emulsifier systems produced in accordance with the aforementioned application Ser. No. 97,029, so that such emulsifier systems can be tailor-made for use with specific petroleum reservoirs.

SUMMARY OF THE INVENTION

These and other objects are accomplished by the present invention, which is based on the discovery that the optimal salinity of emulsifier systems comprising a mixture of an alcohol having no more than 12 carbon atoms and a neutralized, oxidized solvent extracted oil is dependent upon the acid number of the solvent extracted oil produced during the oxidation process, as well as the degree of neutralization of the oxidized oil during the neutralization procedure.

Thus, the present invention provides an improvement in the process for the tertiary recovery of oil wherein (a) brine, (b) an emulsifier system comprising an alcohol having no more than 12 carbon atoms and a surfactant comprising a neutralized, oxidized solvent extracted oil, and (c) a polymer are injected into an injection well and oil recovered from a producing well, the improvement in accordance with the present invention comprising (1) measuring the salt concentration of the brine to be used in the tertiary recovery process, and (2) adjusting the optimal salinity of the emulsifier system to approximate the salt concentration of the brine. Preferably, the optimal salinity of the emulsifier system is adjusted by controlling the acid number and/or degree of neutralization of the oxidized oil.

DETAILED DESCRIPTION

The emulsifier system used in the inventive process comprises a mixture of a surfactant and a cosurfactant. The surfactant is a neutralized, oxidized solvent extracted oil and the cosurfactant is an alcohol having no more than 12 carbon atoms. This emulsifier system and techniques for its manufacture are thoroughly described in the aforementioned application Ser. No. 97,029. As disclosed in Ser. No. 97,029, the solvent extracted oils are conventional petroleum refinery streams produced by extracting aromatics from various streams taken off the vacuum distillation tower of a refinery with solvents such as furfural and phenol. Air oxidation is conveniently accomplished by heating the solvent extracted oil to elevated temperature while contacting the oil with a suitable amount of air. Normally a catalyst is included in the solvent extracted oil to enhance the reaction rate. The catalyst used in air oxidation is normally a mixture of an oil soluble metal compound and a salt of a strong base and a weak acid. Examples of oil soluble metal compounds are manganese stearate, iron naphthenate, iron stearate, copper naphthenate, and copper stearate. The reaction temperature is normally about 250° F. to 350° F. with 285° F. being preferred. The oxidation reaction is continued until the oil exhibits an acid number of about 10 to 40 mg. KOH/gram sample.

In carrying out the inventive process, the optimal salinity of the emulsifier system is adjusted so as to approximate the salt concentration of the brine to be used in the tertiary recovery of oil from a particular petroleum reservoir. As previously indicated, the optimal salinity of an emulsifier system is the salt concentration of the aqueous phase of a micellar emulsion produced from the emulsifier system in which the amount of middle (or micellar) phase is at a maximum. Since the object of using a surfactant in the tertiary recovery of oil is to produce a third phase (micellar phase), most economical operation is achieved when the greatest amount of micellar phase can be produced from the smallest amount of emulsifier system.

In accordance with the invention, the technique for manufacturing the emulsifier system is controlled so that the optimal salinity of the product approximates the salt concentration of the brine to be used in a particular application. For best results, the optimal salinity of the emulsifier system should differ from the salt concentration of the brine by no more than 2%, based on the salt concentration of the brine, preferably 1%, more preferably 0.5%. More preferably, the optimal salinity of the emulsifier system will be controlled so as to match (i.e. be the same as) the salt concentration of the brine.

In accordance with the invention, the optimal salinity of the emulsifier system can be adjusted in a number of different ways. In accordance with one technique, the optimal salinity can be adjusted by controlling the oxidation step during the oxidation of the solvent extracted oil so that an oxidized solvent extracted oil of a predetermined acid number is obtained. In accordance with the invention, it has been found that the optimal salinity of the emulsifier system is dependent upon the acid number of the oxidized solvent extracted oil.

Controlling the acid number of the oxidized solvent extracted oil can be accomplished in a number of ways. For example, the acid number can be controlled by the flow rate of air or other oxidant into the solvent extracted oil during the oxidation step and/or the concentration of catalyst in the reaction system. The acid number is most easily controlled, however, by controlling the time for the oxidation step, shorter reaction times leading to lower acid numbers and longer reaction times leading to higher acid numbers.

Another way of adjusting the optimal salinity of the emulsifier system is by controlling the degree of neutralization of the oxidized solvent extracted oil during the neutralization step. As taught in the aforementioned application Ser. No. 97,029, neutralization is accomplished by adding an inorganic base usually in aqueous solution to the oxidized solvent extracted oil, usually in an amount of about 1 to 4.5 or more times the acid milliequivalents indicated by the acid number. In accordance with the invention, it has been found that emulsifier systems having lower optimal salinities can be produced by using less base during neutralization, while emulsifier systems having greater optimal salinities can be produced by using larger amounts of base.

Still another method for adjusting the optimal salinity of the emulsifier system is to use a combination of the above two techniques. Although each of the above two techniques is independent of one another, they can also be used in combination, and this is in many instances preferable from a standpoint of ease of operation.

The exact acid number to be selected for the oxidation step and/or the exact degree of neutralization selected for the neutralization step vary widely and depend on a number of factors including the composition of the petroleum being recovered and, of course, the salinity of the brine. They can, however, be easily determined by routine experimentation using the petroleum recovered from the reservoir in question and the brine to be used in the recovery process to form a number of test emulsions. Because of the correlation between the optimal salinity of an emulsifier system and the acid number of the oxidized solvent extracted oil, an emulsifier system approximating or preferably matching the reservoir to be processed can be easily developed. In a similar manner, the correlation between the optimal salinity and the degree of neutralization enables the production of an emulsifier system matching or approximating the reservoir to be developed very easily. If desired, both correlations can be employed to help develop an appropriate emulsifier system.

EXAMPLES

The following examples are presented to illustrate the correlation between the acid number of the oxidized solvent extracted oil and/or the degree of neutralization of the oxidized solvent extracted oil on the one hand, and the optimal salinity of the emulsifier system on the other hand.

EXAMPLES 1 TO 4

Four samples of SEN-300 were oxidized under varying conditions to produce oxidized solvent extracted oils of various acid numbers. In each example, an amount of SEN-300 was charged into a 5 liter, three-necked flask together with 1 cc. manganese naphthenate solution (6% manganese in kerosine) per 100 gms. oil and 0.2 gms. $Na_2CO_3$ per 100 gms. oil. The flask was then heated to a temperature of about 285° F. and air was fed to the flask to cause the oxidation reaction. The reaction was exothermic and a cooling system comprising circulating water was employed to control the reaction temperature. Once the reaction started, the reaction temperature normally built to about 350° F. for about 30 minutes and then dropped back down to the desired reaction temperature, about 285° F. During the reaction, the reaction system was constantly stirred with a stirrer operating at a speed of 3,000 rpm. At the termination of the reaction, each of the oxidized products was neutralized at elevated temperature using a 50% aqueous solution of sodium hydroxide. This was accomplished by placing 200 gms. of each product in an 800 ml. beaker and heating to about 120° C. with efficient mechanical mixing. The 50% sodium hydroxide solution was added slowly thereto to avoid foaming and to allow the water to evaporate. Each oxidized oil was neutralized with 3.5 equivalents of sodium hydroxide based on the acid number of the oxidized oil. From the surfactants produced in this manner, four different emulsifier systems were produced by mixing each surfactant with a cosurfactant comprising t-butanol. The surfactant/cosurfactant ratio in each example was 2 to 1.

In order to test the emulsifier systems produced above, test emulsions were made from each of the emulsifier systems. Each test emulsion was produced by dissolving 0.9 cc. of the respective emulsifier systems in 7.05 cc. of dodecane. To this was added 7.05 cc. of brine of various salinities and the mixtures shaken vigorously. Each mixture was then centrifuged for 30 minutes and the volumes of the various phases measured. In addition, the interfacial tensions for each optimal salinity system was measured using the spinning drop tensiometer developed by the University of Texas.

The variables in the manufacture of the oxidized solvent extracted oils, the acid numbers thereof and the results obtained are set forth in the following Table I.

TABLE I

Effect of Acid Number on Optimal Salinity and Other Properties of Emulsifier System Oil: 300 SEN  
Catalysts: Manganese Naphthenate (6%): 1 cc/100 gm. oil  
Sodium Carbonate: 0.2 gm/100 gm. oil  
Surfactant/Co-Surfactant Ratio: 2:1  
Stirrer Speed: 3,000 RPM  
Co-Surfactant: t-butanol  
Hydrocarbon: Dodecane  
Degree of Neutralization: 3.5 milliequivalents base per milliequivalents acid

| | Preparation of Surfactant | | | | Product | | | | |
|---|---|---|---|---|---|---|---|---|---|
| | | | | Surfactant | Optimal | 3 Phase | Interfacial Tens, dynes/cm | | |
| | Grams | Air Flow Rate | Time, | Acid | Salinity, | Range | | | |
| Example | Oil | Ft$^3$/kg oil/Hr | Hrs. | Number | % NaCl | % NaCl | O/M | M/W | O/W |
| 1 | 2,200 | 11.15 | 2 | 21.2 | 4.0 | 3–6+ | 0.0391 | 0.0065 | 0.0607 |
| 2 | 2,200 | 11.15 | 3 | 27.3 | 4.0+ | 3–6+ | 0.1099 | 0.0053 | 0.0511 |
| 3 | 2,500 | 9.82 | 4 | 30.1 | 5.0+ | 4–6+ | 0.0679 | 0.0136 | 0.0284 |
| 4 | 2,000 | 12.27 | 5 | 34.1 | 7.0 | 6–7+ | 0.0212 | 0.0091 | 0.0256 |

Ideally, an emulsifier system in order to be of value in enhanced oil recovery must form three phases in use. The lower phase is composed predominantly of brine with some of the emulsifier dissolved in it, while the upper phase is predominantly hydrocarbon with some emulsifier dissolved in it. The middle or micellar phase contains the bulk of the emulsifier with both the brine and the hydrocarbon in it. Ideally, the micellar phase will contain equal amounts of brine and hydrocarbon and will exhibit very low interfacial tensions.

Table I shows that the optimal salinity of an emulsifier system increases as the surfactant acid number increases. In addition, this table shows that the salinity range over which a three phase system forms is quite broad and also increases as the acid number of the surfactant increases. Furthermore, Table I also shows that the various interfacial tensions are all quite low, indicating that these emulsifier systems will make excellent tertiary oil recovery aids.

EXAMPLES 5 TO 8

Examples 1 to 4 were repeated except that the oxidized solvent extracted oils were neutralized with 1.0 milliequivalents base per milliequivalent acid number. The conditions for the manufacture of the oxidized solvent extracted oils and the results obtained are set forth in the following Table II.

TABLE II

Effect of Acid Number on Optimal Salinity and Other Properties of Emulsifier System Oil: 300 SEN  
Catalysts: Manganese Naphthenate (6%): 1 cc/100 gm. oil  
Sodium Carbonate: 0.2 gm/100 gm. oil  
Surfactant/Co-Surfactant Ratio: 2:1  
Stirrer Speed: 3,000 RPM  
Co-Surfactant: t-butanol  
Hydrocarbon: Dodecane  
Degree of Neutralization: 1.0 milliequivalents base per milliequivalents acid

| | Preparation of Surfactant | | | | Product | | | | |
|---|---|---|---|---|---|---|---|---|---|
| | | | | Surfactant | Optimal | 3 Phase | Interfacial Tens, dynes/cm | | |
| | Grams | Air Flow Rate | Time, | Acid | Salinity, | Range | | | |
| Example | Oil | Ft$^3$/kg oil/Hr | Hrs. | Number | % NaCl | % NaCl | O/M | M/W | O/W |
| 5 | 2,200 | 11.15 | 2 | 21.2 | 1.5 | 1.5–2 | <10$^{-4}$ | 0.0018 | 0.0070 |
| 6 | 2,200 | 11.15 | 3 | 27.3 | 1.5 | 1.5–3 | 0.0003 | 0.0035 | 0.0158 |
| 7 | 2,500 | 9.82 | 4 | 30.1 | 1.5 | 1.5–6+ | 0.0012 | 0.0013 | 0.0206 |
| 8 | 2,000 | 12.27 | 5 | 34.1 | 2.0 | 1.0–6+ | 0.0050 | 0.0038 | — |

Again, it can be seen that the optimal salinities of the emulsifier systems increase as the acid number of the oxidized solvent extracted oil increases, and that the three phase range of the emulsifier system also is a function of the acid number. In addition, it can be seen that the interfacial tensions are all very low, indicating that each of the emulsifier systems will be effective in the tertiary recovery of oil.

EXAMPLES 9 TO 21

A series of examples to show the correlation between degree of neutralization and optimal salinity were also conducted. In each of these examples, 2,200 gms. of SEN-300 was charged into a 5 liter three-necked round-bottom flask equipped with four indentations equally spaced around the periphery to improve agitation. To this was added 22 cc. (1 cc/100 gm. of oil) of a manganese naphthenate solution containing 6% manganese and 4.4 gm (0.2 gm/100 gm. of oil) of solid sodium carbonate. The stirrer, which was operated at 3,000 ppm, entered through the center neck, as did the air supply. The air was introduced into the oil at a rate of 24.53 ft$^3$/hr (11.15 ft$^3$/hr/Kg of oil) through a plurality of small ports directed downward and located directly above the stirrer. A cold finger condenser, through which water at a temperature of about 60° F. was circulated to help control reaction temperature, was inserted through one side neck. Through the other side neck was inserted a gas exhaust tube and a thermowell containing a thermocouple connected to a temperature controller. The reaction mixture was heated to about 250° F. to 275° F., at which time an exothermic reaction set in. The maximum temperature, controlled by the cold finger condenser, was 320° F. This soon dropped to 285° F., which was maintained for 5 hours as the reaction temperature. The resulting product had an acid number of 34.51 (mg. KOH/gm sample) as determined in accordance with the procedure set forth in ASTM D-974.

This oxidized oil was neutralized at room temperature using a 50% aqueous solution of sodium hydroxide. 200 gm. of the oxidized oil was placed in an 800 ml. beaker. An amount of the sodium hydroxide solution ranging from 1.0 to 3.1 equivalents, based on the acid number of the oxidized oil, was added and stirred with a spatula. These mixtures were held for five days at room temperature; they were stirred at least twice a day. The resulting products ranged from a heavy liquid to grease-like in appearance. All appeared to be homogeneous; all still contained the water introduced with the sodium hydroxide.

Each of the above surfactants was formed into an emulsifier system by admixing with a cosurfactant comprising t-butanol, the surfactant/cosurfactant ratio being 2 to 1. These emulsifier systems were then formed into test emulsions in the same way using the same materials and concentrations as in the above Examples 1 to 8. In addition, all of the test emulsions were tested for optimal salinity and three phase range in the same manner as in Examples 1 to 8. The results obtained are set forth in the following Table III.

TABLE III

The Effect of the Degree of Neutralization of Oxidized Oil on Optimal Salinity and Phase Behavior Oxidized Oil Acid Number: 34.51
Surfactant:t-Butanol Ratio: 2:1
Hydrocarbon: Dodecane

| Example | Neutralization Factor Equivalents NaOH | Optimal Salinity % NaCl | 3 Phase Range % NaCl |
|---|---|---|---|
| 9 | 1.0 | 2 | 1-6+ |
| 10 | 1.6 | 4 | 2-6+ |
| 11 | 1.7 | 3 | 3-6+ |
| 12 | 1.8 | 3 | 3-6+ |
| 13 | 1.9 | 4 | 3-6+ |
| 14 | 2.0 | 4 | 3-6+ |
| 15 | 2.5 | 5 | 4-6+ |
| 16 | 2.6 | 5 | 4-6+ |
| 17 | 2.7 | 5 | 4-6+ |
| 18 | 2.8 | 5 | 4-6+ |
| 19 | 2.9 | 6 | 4-6+ |
| 20 | 3.0 | 5 | 4-6+ |
| 21 | 3.1 | 6 | 5-6+ |

As can be seen from Table III, the range of salinities over which three phases form increases as the degree of neutralization of the oxidized oil increases. Similarly, the optimal salinity also increases as the degree of neutralization increases. Thus, the present invention provides a very simple and low cost method of controlling the salinity range over which the emulsifier systems are effective and also the optimal salinity.

Interfacial tension measurements were also made on the optimal salinity systems described in Examples 9 to 21 in the same way described above in connection with Examples 1 to 8. However, in Examples 9 to 21, the amount of emulsifier system in each emulsion varied somewhat since these differences do not significantly affect the interfacial tension measurements. The results obtained are set forth in the following Table IV.

TABLE IV

The Effect of Degree of Neutralization of Oxidized Oil on Interfacial Tension at Optimal Salinity Surfactant:t-butanol Ratio: 2:1
Hydrocarbon: Dodecane

| Example | Neutralization Factor Equivalents NaOH | % Emulsifier | % NaCl | Interfacial Tension dynes/cm O/M | M/W |
|---|---|---|---|---|---|
| 9 | 1.0 | 14 | 2 | 0.0050 | 0.0038 |
| 10 | 1.6 | 14 | 4 | 0.0084 | 0.0124 |
| 11 | 1.7 | 14 | 3 | 0.0093 | 0.0040 |
| 12 | 1.8 | 14 | 3 | 0.0103 | 0.0026 |
| 13 | 1.9 | 12 | 4 | 0.0109 | 0.0067 |
| 14 | 2.0 | 10 | 4 | 0.0070 | 0.0080 |
| 15 | 2.5 | 10 | 5 | 0.0181 | 0.0059 |
| 16 | 2.6 | 10 | 5 | 0.0179 | 0.0039 |
| 17 | 2.7 | 10 | 5 | 0.0165 | 0.0047 |
| 18 | 2.8 | 14 | 5 | 0.0209 | 0.0031 |
| 19 | 2.9 | 14 | 6 | 0.0305 | 0.0091 |
| 20 | 3.0 | 10 | 5 | 0.0258 | 0.0045 |
| 21 | 3.1 | 10 | 6 | 0.0080 | 0.0182 |

In general, Table IV shows that as the degree of neutralization of the oxidized oil (and optimal salinity) increases, so does the interfacial tension between the oil and the middle phase. Interfacial tension between the middle phase and water was unaffected. All are excellent values indicating excellent tertiary oil recovery. Thus, the optimal salinity of an emulsifier system can be controlled while maintaining the low interfacial tension required for tertiary oil recovery.

Although only a few embodiments of the present invention have been described above, it should be appreciated that many modifications can be made without departing from the spirit and scope of the invention. All such modifications are intended to be included within the scope of the present invention, which is to be limited only by the following claims.

We claim:

1. In a process for the tertiary recovery of oil wherein (a) brine, (b) an emulsifier system comprising an alcohol having no more than 12 carbon atoms and a surfactant comprising a neutralized, air-oxidized solvent extracted oil, the air oxidation reaction occurring at a temperature between about 250° F. to 350° F. wherein the solvent extracted oil has a viscosity between 50 SUS at 150° F. and 250 SUS at 210° F. before oxidation and wherein the oxidized solvent extracted oil has an acid number in the range of 10 to 40 before neutralization, and (c), a polymer, are injected into an injection well and oil recovered from a producing well, the improvement comprising:
(1) measuring the salt concentration of said brine, and
(2) adjusting the optimal salinity of said emulsifier system to approximate said salt concentration by:
(i) oxidizing said solvent extracted oil to a predetermined acid number within said range,
or
(ii) neutralizing said oxidized solvent extracted oil with a predetermined amount of base, or
(iii) both (i) and (ii).

2. The process of claim 1 wherein step (2) is accomplished by oxidizing said solvent extracted oil to a predetermined acid number.

3. The process of claim 2 wherein said predetermined acid number is predetermined by:
(1) developing a correlation between the optimal salinity of an emulsifier system and the acid number of the surfactant used in forming the emulsifier system,
and
(2) selecting as the predetermined acid number of the oxidized solvent extracted oil to be produced the acid number corresponding to the salt concentration of said brine according to said correlation.

4. The process of claim 1 wherein step (2) is accomplished by neutralizing said oxidized solvent extracted oil with a predetermined amount of base.

5. The process of claim 4 wherein said amount of base is predetermined by:
(1) developing a correlation between the optimal salinity of an emulsifier system and the amount of base used to neutralize the oxidized solvent extracted oil of said emulsifier system, and
(2) selecting as said predetermined amount of base the amount of base corresponding to the salt concentration of said brine according to said correlation.

* * * * *